United States Patent [19]

Silver

[11] Patent Number: 5,371,863

[45] Date of Patent: Dec. 6, 1994

[54] HIGH SPEED PROCESSOR BUS EXTENSION

[75] Inventor: Jordan R. Silver, San Jose, Calif.

[73] Assignee: Tandem Computers Incorporated, Cupertino, Calif.

[21] Appl. No.: 125,620

[22] Filed: Sep. 22, 1993

Related U.S. Application Data

[63] Continuation of Ser. No. 707,370, May 30, 1991, abandoned.

[51] Int. Cl.⁵ .............................................. G06F 13/14
[52] U.S. Cl. ............................... 395/325; 364/926.91; 364/935.48; 364/DIG. 2; 364/240.5; 364/DIG. 1
[58] Field of Search ............... 395/325, 725, 250, 550; 364/240.5, DIG. 1, 926.91, 935.48, DIG. 2

[56] References Cited

U.S. PATENT DOCUMENTS

| | | | |
|---|---|---|---|
| 3,815,099 | 6/1974 | Cohen et al. | 340/172.5 |
| 4,229,791 | 10/1980 | Levy et al. | 364/200 |
| 4,232,366 | 11/1980 | Levy et al. | 364/200 |
| 4,384,322 | 5/1983 | Bruce et al. | 395/325 |
| 4,451,881 | 5/1984 | Grice et al. | 395/325 |
| 4,451,886 | 5/1984 | Guest et al. | 395/325 |
| 4,488,218 | 12/1984 | Grimes | 395/325 |
| 4,628,447 | 12/1986 | Cartret et al. | 395/725 |
| 4,638,313 | 1/1987 | Sherwood, Jr. et al. | 340/825.52 |
| 4,716,410 | 12/1987 | Nozaki | 340/825.52 |
| 4,745,548 | 5/1988 | Blahut | 395/325 |
| 4,787,029 | 11/1988 | Khan | 395/325 |
| 4,853,846 | 8/1989 | Johnson et al. | 395/325 |
| 4,864,496 | 9/1989 | Triolo et al. | 395/325 |
| 4,910,655 | 3/1990 | Ashkin et al. | 395/325 |
| 4,920,486 | 4/1990 | Nielsen | 395/325 |
| 4,954,821 | 9/1990 | Gray et al. | 340/825.52 |
| 4,979,097 | 12/1990 | Triolo et al. | 395/325 |
| 4,979,099 | 12/1990 | Milia et al. | 395/325 |
| 4,984,195 | 1/1991 | Nakamura et al. | 395/325 |
| 5,006,981 | 4/1991 | Beltz et al. | 395/325 |
| 5,053,947 | 10/1991 | Heibel et al. | 395/325 |
| 5,123,092 | 6/1992 | Buxton et al. | 395/250 |
| 5,138,703 | 8/1992 | Igarashi | 395/325 |

OTHER PUBLICATIONS

"IEEE Standard for a High Performance Synchronous 32-Bit Bus: Multibus II," published by the Institute of Electrical and Electronics Engineers, Inc., Copyright 1988.

IBM Technical Disclosure Bulletin, vol. 16, No. 3, Aug. 1983 (pp. 874–876).

Primary Examiner—Allen R. MacDonald
Assistant Examiner—Glenn A. Auve
Attorney, Agent, or Firm—Townsend and Townsend Khourie and Crew

[57] ABSTRACT

A high speed, synchronous, processor bus is physically and electrically extended by a bus extension unit to provide data communication between a number of data handling units. The bus extension unit intercouples a system bus to an extended buses for communicating information therebetween. The extension monitors both bus and, upon recognition of an initiation for an information transfer transaction from one bus to the other, will relay the initiation of the transaction, implement the transaction, then relay back any handshake signals that form a part of the transaction, all with a minimum delay of one bus cycle.

14 Claims, 2 Drawing Sheets

HIGH SPEED PROCESSOR BUS EXTENSION

This is a continuation of application Ser. No. 07/707,370, filed May 30, 1991, now abandoned.

BACKGROUND OF THE INVENTION

The present invention is directed generally to data processing systems, and more particularly, to apparatus for physically and electrically extending a synchronous bus of a processor system.

Many of today's data processing systems incorporate components, in the form of data handling units, interconnected by a bus system for communicating information therebetween. For example, a central processor unit (CPU) may be interconnected by a system bus structure to a memory storage unit, an input/output (I/O) controller which, in turn, may connect to various peripheral devices by an I/O bus. Typically, data communications on such a system bus that are synchronous; that is, signals that implement whatever protocol is used to sequence information transfers arrive at discrete time intervals (hereinafter "bus cycle") established by a system-wide clock signal. Often, also, such information transfers are "handshaken", in the sense that each bus cycle of the transfer is positively acknowledged by a set of control handshake signals provided by at least one, and often times both, units involved in the transfer.

Thanks largely to recent technological advances in the art of semiconductor and integrated circuit fabrication, component operating speeds have significantly increased so that information transfers can be conducted at extremely high speeds or clock rates. For example, the present invention is for use in a processor system having an interconnecting processor system capable of transferring 32-bit data words (plus 4 bits of parity) in bit parallel, word serial fashion at a 25 MHz rate; the bus cycle is 40 ns.

Unfortunately, as operating speeds of such components increase, signal delays exhibited by internal or external semiconductor components (e.g., gates) become less important than those of intercomponent wiring. Efforts are made, therefore, to put as much of the system onto individual integrated chips. Even so, the desire to modify, upgrade, and/or expand existing processor systems will encounter wiring, loading, (i.e., current-handling capability) and other delay problems.

Thus, often it is found necessary or desireable to physically extend the system bus in order to connect additional data (e.g., memory) handling units to the processor system. Unfortunately, wiring delays, and other physical and electrical properties encountered in high speed systems can, and often do, operate to preclude such addition by mere connection to the system bus; rather, additional data handling units are added by coupling them to the system bus through some form of intelligent intervening device that operates to stage or pipeline data transfers between the data handling units connected directly to the system bus and additional data handling units. The fact of staging itself means that signalling from one side of the stage will now be sequenced a minimum of one cycle (and usually more) after their appearance at the other side of the stage. It is, therefore, the job of this intelligent staging device to satisfy the sequencing of each side so that it is transparent to the data handling devices, and does not increase the number of cycles per transaction, other than the necessary stage cycle itself. With high speed data processing systems, this can be an impossible task.

SUMMARY OF THE INVENTION

According to the present invention, there is provided a bus extension that communicates a synchronous system bus, having a number of data handling units coupled thereto, to an extended bus to which may be coupled additional data handling units, without unduly impeding data transfers across the extension from one bus to another, or significantly loading the data handling devices attached thereto.

The present invention is used in connection with a processor system that includes a number of data handling units such as, for example, a central processing unit, a memory unit, and an I/O controller, interconnected by a system bus for communicating information therebetween. An information transfer transaction is conducted according to a protocol that sees one of the data handling units (e.g., the CPU) initiating the transfer with signals that are applied to the system bus, to identify the type of transaction desired together with an identification of the data handling unit that will cooperate in the transaction. Initiation of the transaction is followed by the information transfer requested (i.e., data is read from the memory unit by the CPU, or written to a peripheral device by the CPU via the I/O controller).

For the purposes of the remainder of this discussion, "Requestor" or "Requestor data handling unit" will be understood as referring to the data handling unit that initiates (is requesting) an information transfer. The data handling unit identified for response will be the "Responder" or "Responder data handling unit." The information transfer itself may also be referred to as a "transaction."

The bus extension of the present invention is configured to monitor both the system and extended buses to which it is connected to determine whether the transaction is to be from one bus (e.g., system bus) to the other (e.g., extended bus). Since both sides of the bus extension are bi-directional, it is important that the bus extension not repeat the transaction or respond to the transaction unless the destination of the information transferred is across the bus extension, from one bus to the other. Thus, the initiation of transaction signalling must be constantly monitored, and the bus on which it first appears will be the initiating side. The bus extension will recognize, from the initiating signalling, the destination address and be aware of the physical locations of the identified data handling units that will participate in the transaction. If the destination is across the bus extension from the initiating Requestor data handler unit, the extension will repeat all bus signals from the Requestor to the other side on the following bus cycle, and also respond to the Requestor with the handshake signals provided by the Responder data handling unit.

In accordance with the transaction protocol used by the processor system, as indicated above, a single-ended handshake technique is used: Each bus cycle in which information is transferred is accompanied by a signalling from the Responder indicative of its view of the transfer.

The response to the Requestor by the bus extension is the substitute of initial handshake signalling, that according to the protocol used, indicates the destination device (Responder) has not yet serviced the transaction request. The substitution continues until the destination device actively drives the handshake signals.

Also, the bus extension must be aware of the type of transaction, such as whether it is a read or write operation, in order to determine the direction of the transfer of information. Therefrom, the bus extension knows which of the two bi-directional buses (the system bus or the extended bus) is driven from signals received from the other. For example, assume the CPU desires to perform a read operation that will cause an information transfer from the extended bus. The bus extension of the present invention must first drive the extended bus with the destination address, and control information, identifying the request; then it must allow the destination Responder to drive the extended bus, while initially driving the system bus with the substitute handshake; finally, the bus extension must repeat the information from the Responder onto the system bus for receipt by the Requestor.

In addition, the bus extension will need to assert a special signal that informs the Responder that the transaction is a bus-to-bus request. This is important in special cases when the length of a transaction is unknown. Since a transaction signal will be delivered by the initiating Requestor data handling unit, and is delayed one cycle by the bus extension to the Responder data handling unit, the Requestor side of the bus extension can finish ahead of the Responder. The bus extension will end the transaction on the Requestor side while the Responder is still in operation. This corresponds to the Responder supplying additional data that the Requestor did not want. Depending upon how the Responder operates, this additional data may cause an internal error to the Responder. The special signal is, therefore, used by the Responder to ignore this extra data.

A number of advantages should now be apparent from the present invention. A high-speed system processor bus can be physically extended (lengthened) while continuing to preserve and maintain acceptable electrical signal levels and quality. In addition, the present invention permits the extension to take place on a synchronous, handshaken bus to physically separate and electrically isolate units utilizing the same protocol with a minimum of overhead or delay.

These and other advantages of the present invention will become apparent to those skilled in the art upon a reading of the following detailed description of the invention, which should be taken in conjunction with the accompanying drawings.

BRIEF DESCRIPTION OF THE DRAWINGS

FIG. 3 is a block diagram illustration of an aspect of the invention.

DETAILED DESCRIPTION OF THE INVENTION

Figure 1:
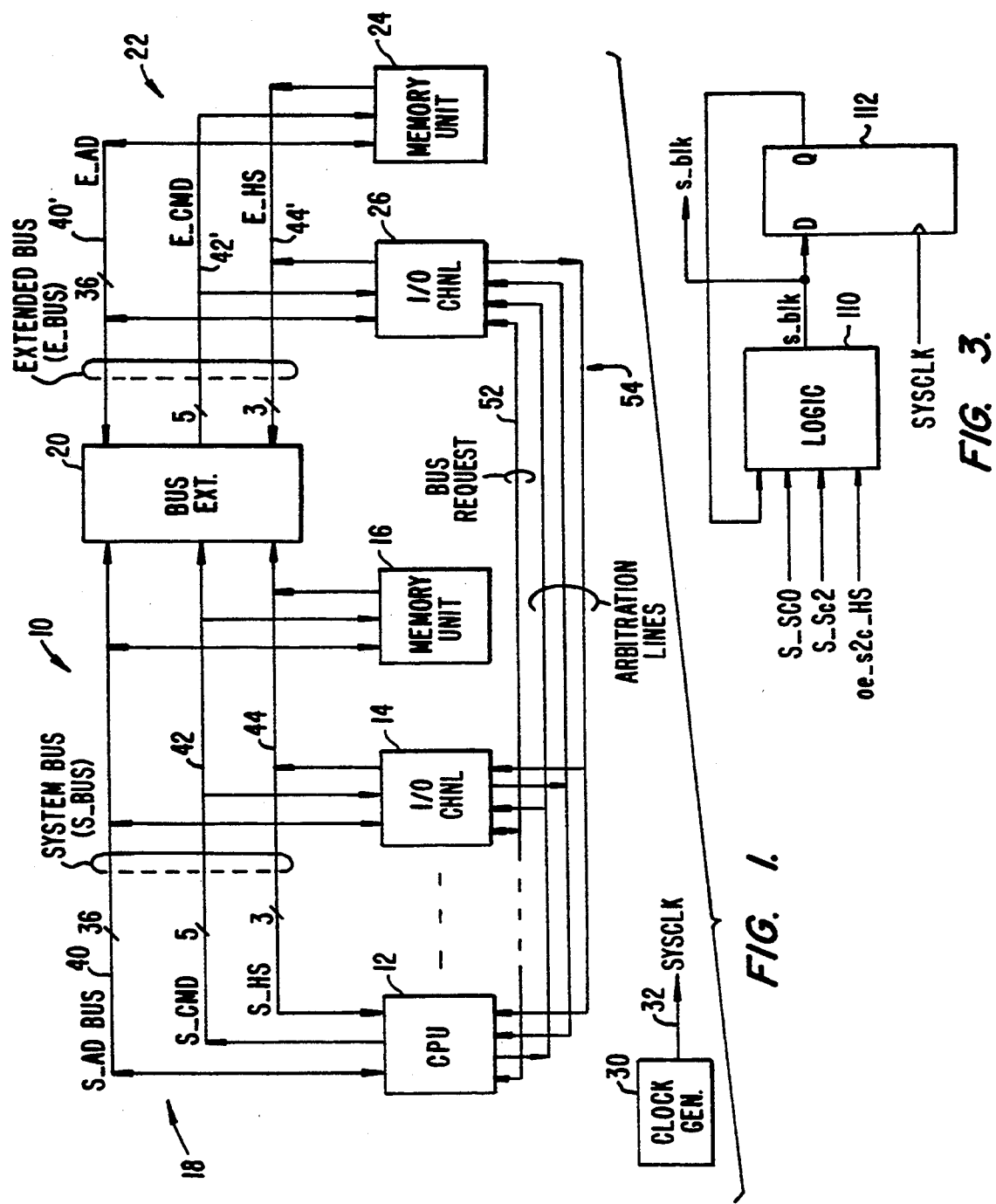
FIG. 1 is a simplified block diagram of a processor system incorporating the present invention to extend the system bus to an extended bus.

Turning now to the figures, and for the moment specifically FIG. 1, there is illustrated a processor system, designated generally with the reference numeral 10. As shown, the processor system 10 includes a number of data handling units in the form of a central processing unit (CPU) 12, an I/O channel 14, and a memory unit 16, interconnected by a system bus (S_BUS) 16.

Also connected to the S_BUS 18 is a bus extension 20, constructed according to the teachings of the present invention, that couples the S_BUS 18 to an extended bus (E_BUS) 22. In turn, the E_BUS 22 is coupled to data handling units in the form of a second memory unit 24 and an I/O channel 26.

The processor system 10 also includes a clock generator 30 which delivers a system clock (SYSCLK), in the form of a periodic clock signal, to the elements (e.g., CPU 12, memory unit 16, bus extension 20, I/O channel 26, etc.) of the processor system 10. The SYSCLK signal is used, among other things, to define successive information transfer intervals on the S_BUS 18 and/or E_BUS 22, hereinafter referred to as "Bus Cycles." Each such Bus Cycle defines a period during which information (command or data) can be transferred from, for example, the memory unit 16 to the CPU 12 or vice versa.

The clock generator 20 may be of conventional design, providing the SYSCLK signal on a single signal line 32, or it may be of a design that provides a plurality of synchronized clock signals, one for each of the data handling units of the processor system 10, in which case the signal line 32 represents multiple signal lines, one for each element of the processor system 10. The latter is preferred for hiqh speed operation, and a self-calibrating clock synchronization system of U.S. Pat. No. 471,915, assigned to the assignee of this invention, is an example of such a clock generator.

The processor system 10 is constructed to implement a novel bus protocol designed to set the rules for access to, and the transfer of information, on such high speed processor system buses as the S_BUS 18 and E_BUS 22. This protocol, and its implementation, are more fully described in co-pending application Ser. No. 07/707,714, the disclosure of which is incorporated herein by reference.

According to the aforementioned protocol, the data handling units of the processor system 10 (e.g., CPU 12, I/O channel 14, etc.) may be one of three types: First, it may be a "Requestor" data handling unit in the sense that information transfers on the S_BUS and/or E_BUS are requested; The CPU 12, I/O channels 14 and 26 are examples of this first type. Second, other of the data handling units may be a "Responder" data handling unit in the sense that they are structured solely to respond for requests for information transfers; the memory unit 16 and 24 are examples of this second type. Finally, the third type of data handling unit is one that is capable of functioning both as a Responder and Requestor; this type can initiate a request for information one moment, and respond to a request for information another moment. The I/O channels 14 and 26, if provided, for example, with direct memory access can be an example of this third type.

Continuing with FIG. 1, the S_BUS 18 comprises 48 individual signal lines, 36 of which form system address-/data (S_AD) lines 40 that are used to transfer address and data (with associated parity) information. Thirty-two of the S_AD signal lines 40 carry 4 bytes (32 bits), in parallel, of address or data information, while four of the S_AD signal lines 40 carry parity—one parity bit for each byte of address/data.

The S_BUS 18 further includes two sets of control lines for carrying system control information. One set, system command (S_CMD) lines 42, carries five bits (parallel) of system command information used to identify the type of transaction being requested. The other set, system handshake (S_HS) lines 42, carries three bits of handshake information indicative of the Responder's view of the transaction during any bus cycle in which data is being transferred.

The signal lines forming the S_BUS 18 have identical counterparts formed by the E_BUS 22 in the extended address/data (E_AD) signal lines 40', extended command (E_CMD) lines 42', and extended handshake (E_HS) lines 44'.

Access to the S_BUS 18 (or E_BUS 22), according to the bus protocol is initiated by a Bus Request that is asserted; on a common (to all Requestor or Requestor/Responder data handling units) signal line 52, together with an arbitration signal unique to the Requestor and carried on one of a plurality of arbitration lines 54. The signals carried by these signal lines are communicated point-to-point, are not necessarily time-sensitive, and, therefore, need not be processed through the bus extension 20 of the present invention.

As preferably implemented, and as described in the co-pending application, above-identified, the bus protocol used here provides for fair bus access to a default device, (e.g., CPU 12) through the use of signalling other than use of the Bus Request signal. That signalling is not important to the present invention and, therefore, for the purposes of clarity, the processor system 10 is not described as including such a default device. Accordingly, all Requestor data handling units are assumed to use a Bus Request signal to request access to the S_BUS 18 (or E_BUS 22) for an information transfer transaction.

Briefly, access to the S BUS_18 (or E_BUS 22), according to the bus protocol used, is initiated when a Requestor data handling unit (e.g., CPU 12) asserts the Bus Request signal on signal line 52. If and when bus access is granted, the Requestor data handling unit will place, on the S_AD bus 40, an address that identifies the Responder data handling unit, e.g., memory unit 16. At the same time, the Requestor will assert system command signals on the command lines (S_CMD) 42, identifying the type of information transfer requested. When the Responder data handling unit (e.g., memory unit 16) complies with the request, information transfers are handshaken by signalling on the handshake signal lines (S_HS) 44.

If, for example, the CPU 12 requests an information transfer with the memory unit 24, the colloquy must be processed through the bus extension 20. It is the responsibility, therefore, of the bus extension 20 to recognize which of the two buses (S_BUS 18 or E_BUS 22) carries the initiating signals, and to determine whether the response is to be from the other bus. If so, it must handle the transfer, including the handshake signals.

Before continuing with a description of the bus extender 20, a closer look at the command signals carried by the signal lines 42 and 44 (as well as 42', 44') will aid in understanding the operation of the bus extension 20.

The control lines 42, 44 (42', 44') communicate 8 bits of control information between a Requestor data handling unit (e.g., CPU 12) and a Responder data handling unit (e.g., memory unit 16). As indicated above, the two sets of control lines, S_CMD 42 and S_HS 44 (as well as E_CMD 42' and E_HS 44') communicate eight bits of system control information (SC[7:0]) in the form of commands and handshakes. The specific meanings of the system control signals carried by the control S_CMD, S_HS signal lines 42, 44 (and 42', 44') are set forth below in Table I.

TABLE I

| Signal Line | Command Phase | Data Phase |
|---|---|---|
| sc[0] | Command Phase Valid=1 | Command Phase Valid=0 |
| sc[1] | Transfer Operation[0] | EOT |
| sc[2] | Transfer Operation[1] | Parity (for SC[4:0]) |
| sc[3] | Byte_Length[0] | na |
| sc[4] | Byte_Length[1] | na |
| sc[5] | na | Responder Handshake |
| sc[6] | na | Responder Handshake |
| sc[7] | na | Responder Handshake |

Information transfers on the S_BUS 18 or E_BUS 22 are conducted in two sequential phases, a command phase and a data phase. The command phase, as indicated above, will include signals that are asserted on the S_CMD and/or E_CMD lines 42' to identify the type of information transfer to be conducted; the Responder data handling unit is identified by the address information carried on the S_AD and/or E_AD signal lines 40, 40'. The command phase is followed by the data phase, during which the transfer of the requested information is made during one or more Bus Cycles. The command phase, as Table I indicates, is identified by assertion of the SC[0]system control signal. The SC[1] and SC[2] system control signals define the type of transfer operation desired. Table 2, below, sets forth the interpretation of these two system control signals.

TABLE II

| SC[2:1] | OPERATION |
|---|---|
| 00 | read |
| 01 | write |
| 10 | block read |
| 11 | block write |

Simple read and write operations (as opposed to block read or write operations) result in the transfer (on the S_AD and/or E_AD signal lines 40, 40') of up to 4 bytes of data, and may be conducted in two Bus Cycles: a Bus Cycle of command phase and one or more Bus Cycles of data phase. The control signals SC[3] and SC[4] (Table 3, below) define the number of bytes of data transferred during such simple reads and writes.

TABLE III

| SC[4:3] | BYTE LENGTH |
|---|---|
| 00 | 1 |
| 01 | 2 |
| 10 | 3 |
| 11 | 4 |

The block read and write operations (Table II) are of indeterminant length. During block transfers the Responder data handling unit merely continues to send (or receive) data during the data phase until an end of transmission (EOT; assertion of SC[1]) signal is detected.

During the data phase, the control signals SC[7:5], carried by the S_HS and/or E_HS signal lines 44, 44' are provided by the Responder data handling unit (e.g., memory unit or memory unit 24), coded to signal to the Requestor data handling unit the status of each piece of information it transferred during each bus cycle. During the command phase the control signals SC[7:5] are not applicable (NA), and therefore can be of any state. The definitions of the Responder handshake codes are identified in Table IV, below.

TABLE IV

| SC[7:5] | HANDSHAKE |
|---|---|
| 000 | WAIT |
| 001 | Data Predict ("PREDICT") |
| 01X | Uncorrectable Data Error (UCME); Soft Abort |
| 10X | Normal ("NORM") |
| 11X - | Correctable Data Error |

During a data phase, the Responder data handling unit will determine whether or not it believes the data word being transferred during each bus cycle of a data phase is successful. If so, the Responder will assert the NORM code on the S_HS and/or E_HS signal lines 44, 44'. Thereby, the Requestor data handling unit is informed that, insofar as the other end of the transfer is concerned, the information transfer of that bus cycle is complete.

If, on the other hand, the Responder feels that the transfer will not be successful, it will assert the WAIT handshake signal, informing the Requestor that the information transfer of the bus cycle did not occur.

During the read or block read operations, a "data predict" system handshake code may be used by the Responder to indicate that data is coming the next bus cycle, giving the Requestor (e.g., CPU 12) time to set up to receive data; alternatively, the data predict handshake also signals the Requestor that the Responder itself is not yet ready to effect the transfer.

As described more fully in the above-identified, co-pending application, each Bus Cycle begins with the rising edge (i.e., LOW to HIGH transition) of SYSCLK. Information on the S_BUS 18 (and/or E_BUS 22) is then assumed valid. For a more complete understanding of the bus protocol implemented by the processor system 10, reference should be made to the aforementioned, co-pending application.

It will be evident from the foregoing description of the bus protocol, so implemented by the processing system 10, that the bus extension 20 has several important responsibilities. First, when a data transfer transaction is initiated, the bus extension 20 must identify which bus (S_BUS 18 or E_BUS 22) has the Requestor data handling unit that is initiating the transaction; second, it must determine from the address whether the transaction is across the bus extension 20; third, it must determine the type of transaction so that it can relay the data in the proper direction; fourth, it must relay handshakes and command signals in the proper direction; fifth, it must be able to relay the signals from the S_BUS 18 or E_BUS 22 to the other in a minimum amount of time; and finally, if the transaction is to be conducted solely on the S_BUS 18 or E_BUS 22, it must isolate the two busses from one another.

Figure 2:
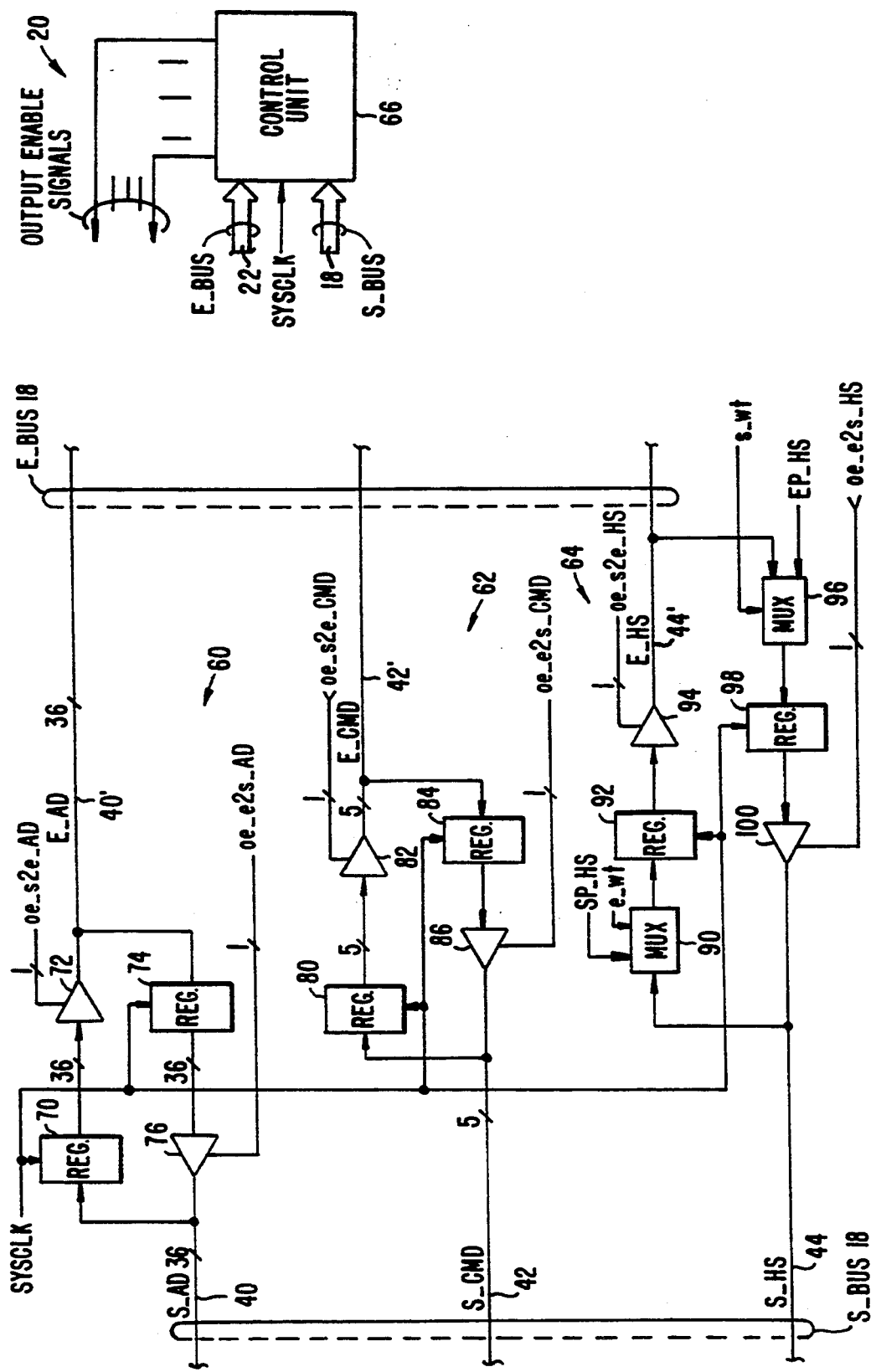
FIG. 2 is a simplified logic diagram of the invention.

Referring now to FIG. 2, the bus extension 20 illustrated in greater detail. As FIG. 2 shows, the bus extension 20 includes three sets of transfer logic 60, 62, 64 for communicating the respective groups of signal lines that form the S_BUS 18 and E_BUS 22 to one another, but in only one direction at any moment in time. Control of the sets of transfer logic 60-64 is effected by a control unit 66.

The transfer logic 60 communicates the S_AD and E_AD signal line 40, 40' to one another. The S_AD signal lines 40 are received by a 36-bit wide register 70 that is clocked on the rising edge of SYSCLK temporarily storing the information carried by the S_AD lines 40. The content of the register 70 is applied to three-state driver circuits 72 that are enabled by an output enable signal, oe_s2e_AD, provided by the control unit 66. When asserted, the oe_s2e_AD signal enables the three-state drives 72 to communicate the content of the register 70 to the E_AD signal lines 40'.

Similarly, the E_AD signal lines are applied to registers 74, also clocked by the SYSCLK signal. The content of the register 74 is applied to the S_AD signal lines 40 via three-state driver circuits 76 when the output enable signal, oe_e2s_AD from control unit 66 .

A similar arrangement is found in the transfer logic 62. The S_CMD signal lines 42 are communicated to the E_CMD signal lines 42' via the temporary storage provided by the register 80 and the three-state drivers 82. The three-state drivers 82 are enabled by the output enable signal oe_s2e_CMD to communicate system command signals contained in the register 80 to the E_BUS 22 (i.e., to the E_CMD lines 42'). Command signals from the E_CMD lines 42' of the E_BUS 22 to the corresponding S_CMD lines 42 of the S_BUS 18 are likewise communicated via the temporary storage of registers 84 (also clocked by SYSCLK) and the set of three-state drivers 86, under command of the output enable signal oe_e2s_CMD.

The transport logic 64 is basically the same as the sets of transport logic 60 and 62, with the exception that there are multiplexers included in order to force the special handshake signal (SP_SH, EP_SH), mentioned above, and provided by the control unit 66, onto the E_HS or S_HS buses 44', 44, respectively. Thus, the S_HS signal lines 44 of the S_BUS 18 are coupled to a multiplexer 90, the output of which is applied to a storage register 92, and from there communicated to the E_HS signal lines via the three-state drivers 94. The three-state drives enabled by the output enable signal, oe_s2e_HS, from the control unit 66, to pass the content of the storage register 98 to the S_HS lines 44.

In similar fashion the signals on the E_HS signal lines 44' are communicated to the S_HS signal lines 44 via a multiplexer 96, storage registers 98, and three-state drivers 100, extended handshake enabled by the output enable signal, oe_e2s_HS.

Before continuing, it may be beneficial to expand upon the special handshake signals SP_HS and EP_HS supplied, respectively, the E_HS lines 44' or the S_HS lines 44 by the control unit 66.

As indicated above, during the data phase of a transaction each Bus Cycle is simultaneously accompanied by a handshake signal on the S_HS and/or E_HS lines 44, 44' that provides the Responder's view of the transfer. In light of the fact that there will be a one-bus cycle delay of information transfer from one bus to the other by the temporary storage registers (e.g., registers 70 or 74, in the case of the AD signal lines), the Responder will not be able to immediately handshake the first Bus Cycle of information transfer. Accordingly, the control logic unit 66 forces the special handshake signal (SP_HS for transfers from the S_BUS 18 to the E_BUS 22; EP_HS for transfer in the other direction) which appears to the Requestor data handling unit as a WAIT handshake signal. Which of the signalling is to be communicated is selected by the MUXes 90, 96 (e.g., the handshake carried by the S_HS signal lines 44 or the special WAIT signal, SP_HS) is determined by the control logic 66. That determination is exhibited by the selection signals e_wt and s_wt, in a manner that will be discussed below.

Returning to FIG. 2, it can be seen that control logic 66 receives the S_BUS and E_BUS signal lines 18, 22 in order to monitor the signals communicated on those buses for determining what action to take.

The control effected by the control unit 66 is derived from the signals communicated on the S_BUS and E_BUS signal lines 18, 22, and result in the various output enable signals (e.g., oe_s2e_AD) that enable (or disable) the corresponding three-state driver circuits (e.g., three-state driver circuits 72). The signals received by the control unit 66 are processed by combinatorial logic circuits (not shown) designed according to the logic equations 1-9, set forth below:

Eq. 1:
oe_e2s_CMD =
  [e_sc0      & !oe_s2e_HS        & e_ad28         & e_ad24] +
  [e_sc0      & !oe_s2e_HS        & e_ad28         & !e_ad25
              & !e_ad23] +
  [e_sc0      & !oe_s2e_HS        & !e_ad28        & !e_ad27
              & !e_ad26           & !e_ad25] +
  [Q          & !e_blk            & !reg_s_sc7     & !reg_s_sc6] +
  [Q          & e_blk             & !reg_s_sc1]

Eq. 2:
oe_e2s_HS =
  [e_sc0      & !oe_s2e_HS        & e_ad28         & e_ad24] +
  [e_sc0      & !oe_s2e_HS        & e_ad28         & !e_ad25
              & !e_ad23] +
  [e_sc0      & !oe_s2e_HS        & !e_ad28        & !e_ad27
              & !e_ad26           & !e_ad25] +
  [e_sc0      & e_ad28            & e_ad27         & e_ad26
              & !e_ad25] +
  [Q          & !e_blk            & !reg_s_sc7     & !reg_s_sc6] +
  [Q          & e_blk             & !reg s sc1]

Eq. 3:
oe_e2s_AD =
  [e_sc0      & !oe_s2e_HS] +
  [Q          & oe_e2s_CMD        & e_wt           & !e_blk
              & !reg_s_sc7        & !reg_s_sc6] +
  [Q          & oe_e2s_CMD        & e_wt           & e_blk
              & reg_s_sc1] +
  [oe_s2e_HS  & !s_wt] +
  [Q          & !s_blk            & !s_sc7         & !s_sc6] +
  [Q          & s_blk             & !reg_s_sc1]

Eq. 4:
oe_s2e_HS =
  [s_sc0      & !oe_e2s_CMD       & s_ad28         & s_ad25
              & !s_ad24] +
  [s_sc0      & !oe_e2s_CMD       & s_ad28         & !s_ad26
              & s_ad23] +
  [s_sc0      & !oe_e2s_CMD       & !s_ad28        & s_ad27] +
  [s_sc0      & !oe_e2s_CMD       & !s_ad28        & s_ad26] +
  [s_sc0      & !oe_e2s_CMD       & !s_ad28        & s_ad25] +
  [Q          & !s_blk            & !reg_e_sc7     & !reg_e_sc6] +
  [Q          & s_blk             & !reg_e_sc1]

Eq. 5:
oe_s2e_CMD =
  [s_sc0      & !oe_e2s_CMD       & s_ad28         & s_ad25
              & !s_ad24] +
  [s_sc0      & !oe_e2s_CMD       & s_ad28         & !s_ad26
              & s_ad23] +
  [s_sc0      & !oe_e2s_CMD       & !s_ad28        & s_ad27] +
  [s_sc0      & !oe_e2s_CMD       & !s_ad28        & s_ad26] +
  [s_sc0      & !oe_e2s_CMD       & !s_ad28        & s_ad25] +
  [Q          & !s_blk            & !reg_e_sc7     & !reg_e_sc6] +
  [Q          & s_blk             & !reg_e_sc1]

Eq. 6:
oe_s2e_AD =
  [s_sc0      & !oe_e2s_CMD
              +
  [Q          & oe_s2e_HS         & s_wt           & !s_bl
              & !reg_e_sc7        & !reg_e_sc6] +
  [Q          & oe_s2e_HS         & s_wt           & s_blk
              & reg_e_sc1] +
  [oe_e2s_CMD & !e_wt] +
  [Q          & !e_blk            & !e_sc7         & !e_sc6] +
  [Q          & e_blk             & !reg_e_sc1]
where, Eq. 7:
s_blk =
  [s_sc0      & s_sc2] +
  [Q          & oe_s2e_HS]

Eq. 8:
e_blk =
  [e_sc0      & e_sc2] +
  [Q          & oe_e2s_CMD]

-continued

Eq. 9:
s_wt =
    [s_sc0      & s_sc1] +
    [Q      & oe_s2e_HS]

Eq. 10:
e_wt =
    [e_sc0      - & e_sc1] +
    [Q      & oe_e2s_CMD]

A word about the terminology used in these logic equations: First, the ampersand (&) is used to indicate a logical AND operation of the terms on either side of the ampersand. Thus, the terms contained in each bracketed expression are logically ANDed, and each term must be TRUE for the bracketed expression to be TRUE. Second, the plus sign (+) is used to indicate the logical OR function. Thus, for each of the nine equations, he bracketed expressions are logically ORed with each other.

Third, the exclamation point (!) is used to indicate a logical NOT. Thus, for example, in the first bracketed expression of equation 1, the term !oe_s2e_HS is to be read as $\overline{oe\_s2e\_HS}$ (i.e., NOT TRUE).

The term Q is a latching term and is indigenous to each individual equation. This is perhaps best described by reference to the latch circuit illustrated in FIG. 3 for the logic equation that produces the s_blk signal. The s_blk signal is produced to indicate that a block information transfer (i.e., two or more successive data words in the transaction) from the S_BUS 18 to the E_BUS 22 is to be (or is being) performed. The combinatorial logic that asserts the s_blk signal is represented in FIG. 3 as logic 110, and is shown as receiving, as inputs, system control signals s_sc0 and s_sc2, two of the signal lines from the S_CMD signal lines 42. The logic 110 also receives as the handshake output enable for S_BUS 18 to E_BUS 22 transfers, oe_s2e_HS (produced by implementing Eq. 4, above).

Referring to equation 7, note that s_blk will first be asserted when the S_CMD signal lines 42 carry signals indicating that the command phase is valid (SC[0]=ONE) and the system command bit SC[2] is asserted, indicating a block operation. (See Table I, above). This will cause the s_blk signal from logic 110 to be asserted during the command phase of a transaction. As FIG. 3 illustrates, s_blk is applied to the data (D) input of a (positive going) edge triggered D-type flip-flop 112, clocked by SYSCLK. The bus cycle immediately following the command phase will, in essence, latch the s_blk signal, and the Q output of the flip-flop 112 will become TRUE. This Q output of flip-flop 112 is the Q in equation 7. Note, that as FIG. 3 illustrates, the Q output of the flip-flop 112 is fed back and applied as an input to logic 110. The s_blk signal will continue to be asserted as long as the Q output of the flip-flop 112 is TRUE, and the output enable signal, oe_s2e_HS, is also TRUE.

Referring now to the equation for the output enable signal, oe_s2e_HS (Eq. 4, above), note that oe_s2e_HS will continue to remain TRUE as long as its own Q is set, and s_blk is asserted, and the !reg_e_scl signal is TRUE (i.e., reg_e_scl is NOT asserted). The signal reg_e_scl is a registered (i.e., stored in a storage register—not shown—in the control unit 66) version of the control signal SC[1] that is communicated on the S_CMD lines 42 of the S_BUS 18. As Table I, above, indicates, when reg_e_scl becomes TRUE, during the data phase of a transaction, it signals the EOT signal (see Table 1), the s_blk signal will be de-asserted, the flip-flop 112 will be reset, and the Q term of s_BLK (Eq. 7) will become FALSE. In the same vane, the output enable handshake signal oe_s2e_HS is de-asserted.

Similar analysis may be made of the other equations.

Other of the terms are as follows: the s_scX (e.g. s_sc0) refers to the system control signals (sc[7:0]) carried by the S_CMD or S_HS signal lines 42, 44. The s_adXX terms (e.g., s_ad28) refer to the address signals carried by the S_AD signal lines 40 during the command phase of an information transfer transaction. The terms reg_e_scX refer to the system control signals from the registers 80, 92 of the transfer logic 62, 64, respectively.

Similar terms of the logic equations are developed from signals carried by the signal lines E_AD, E_CMD, and E_HS 40', 42', 44' of the E_BUS 22.

Finally, the EP_HS signal is developed from the S_WT signal, and the SP_HS signal likewise developed from the E_WT signal to force a WAIT handshake (see Table 4, above) during the first bus cycle of the data phase of an information transfer transaction, as discussed above.

What is claimed is:

1. Apparatus for extending a synchronous system bus means to a separate, electrically isolated extended bus means, the system bus means and the extended bus means each including first signal lines for communicating address and/or data signals, and second signals lines for communicating control signals; the apparatus comprising:

first transfer means operating in a first state in response to a first enable signal to communicate the address and/or data signals from the system bus means to the extended bus means, in a second state in response to a second enable signal to communicate the address and/or data signals for the extended bus means to the system bus means, and a third state in absence of the first and second enable signals to block address and/or data signals communicated on one of the system bus means or the extended bus means from being communicated to the other;

second transfer means operating in a first state in response to a third enable signal to communicate the control signals from the system bus means to the extended bus means, in a second state in response to a fourth enable signal to communicate the control signals from the extended bus means to the system bus means, and a third state in absence of the third and fourth enable signals to block control signals communicated on one of the system bus means or the extended bus means from being communicated to the other; and control means coupled to the system bus means and the extended bus means to receive the address/data and control signals communicated thereon for asserting therefrom the first, second, third, and fourth enable signals.

2. The apparatus of claim 1, including clock means for producing a periodic clock signal to define individual bus cycles during which successive portions of the address and/or data signals are transferred, the first and second transfer means including means operable to transfer the address and/or data portions from the one of the system bus means or extended bus means to the other one of the system bus means or the extended bus means approximately one bus cycle later.

3. In a processor system of a type having a number of system data handling units intercoupled by a system bus means for communicating information therebetween, bus extension apparatus for coupling the system bus means to an extended bus means, the extended bus means having additional data handling units coupled thereto in response to (a) initiation of an information transfer transaction by at least a Requestor one of the system data handling units and a one of the additional data handling unit or (b) a Requestor one of the additional data handling units and a one of the system data handling units, and for inhibiting communication of information therebetween when the information transfer is to be conducted on the system bus means only or on the extended bus means only, the bus extension apparatus comprising:

transfer means responsive to an enable signal for operation in a first state to communicate information signals between the system bus means and the extended bus means, and, in absence of the enable signal, for operation in a second state to inhibit communication between the system bus means and the extended bus means; and control means coupled to receive information communicated on the system bus means and the extended bus means for asserting the enable signal only when an information transfer transaction is initiated by the first one of the system data handling units for communication with a one of the additional data handling units or when an information transfer is initiated by the first one of the additional data handling units for communication with a one of the system data handling units for asserting the enable signal, the control means including means for holding the transfer logic means in the first state until receipt on the system bus and/or extended bus means of a reset signal.

4. The bus extension apparatus of claim 3, wherein the system bus means and the extended bus means each includes address/data bus means for communicating address information and data information in a time-multiplexed manner, the control means including means responsive to the address information for determining if an information communication is to take place between the system bus means and the extended bus means.

5. The bus extension of claim 4, the control means operating to maintain the enable signal in a non-asserted condition until address information on the address/data bus means of the system data bus means indicates an information communication is to take place between the system bus means and the extended bus means or the address information on the address/data bus means of the extended bus means indicates an information communication is to take place between the extended bus means and the system bus means.

6. The bus extension apparatus of claim 4, wherein information communicated on the system bus means and the extended bus means includes control information indicative of the origination of the information communicated, the control means including means responsive to the control information for emulating recipient acknowledgments.

7. In a processor system of a type having a number of system data handling units intercoupled by a high speed system bus means for communicating information therebetween, bus extension apparatus for coupling the system bus to an extended bus means having additional data handling units coupled thereto, the bus extension apparatus comprising:

first logic means coupled to separately receive information communicated on the system bus means and the extended bus means for determining that an information transfer transaction is to occur between a one of the system data handling units and a one of the additional data handling units; and transfer logic means responsive to the first logic means and operating in a first state for communicating information signals between the system bus means and/or the extended bus means, and in a second state for blocking communication between the system bus means and the extended bus means when an information transfer is to be only between the system data handling units or only between the additional data handling units;

the first logic means including means for holding the transfer logic means in the first state until receipt on the system bus means and/or extended bus means of reset signal.

8. The bus extension apparatus of claim 7, wherein the first logic means includes means for communicating information signals in one direction only during an information transfer transaction from the system bus means to the extended bus means or from the extended bus means to the system bus means.

9. The bus extension apparatus of claim 7, including clock means for producing a periodic clock signal to define individual bus cycles during which successive portions of the information are transferred, the transfer means including means for transferring the information portions from the one of the system bus means or extended bus means to the other one of the system bus means or the extended bus means one bus cycle later.

10. The bus extension apparatus of claim 7, wherein the information includes control information indicative of the origination of the information communicated, the transfer logic means including means responsive to the first logic means for emulating recipient acknowledgments.

11. In a processor system of a type having a number of system data handling units intercoupled by a high speed system bus means for communicating information therebetween and clock means for producing a periodic clock signal to define individual bus cycles during which successive portions of the information are transferred, bus extension apparatus for coupling the system bus means to an extended bus means having additional data handling units coupled thereto, the bus extension apparatus comprising:

first logic means coupled to separately receive information communicated on the system bus means and the extended bus means for determining that an information transfer transaction is to occur between a one of the system data handling units and a one of the additional data handling units; and transfer logic means responsive to the first logic means for operating in a first state for transferring the information portions from the one of the system bus means or the extended bus means to the other of the system bus means or the extended bus means one bus cycle later, and a second state for blocking communication between the system bus means and the extended bus means when an information transfer is to be only between the system data handling units or only between the additional data handling units;

wherein the first logic means includes means for holding the transfer logic means in the first state until receipt on the system bus means and/or extended bus means of a reset signal.

12. The bus extension apparatus of claim 11, wherein the first logic means includes means for communicating information signals in one direction only during an information transfer transaction from the system bus means to the extended bus means or from the extended bus means to the system bus means.

13. The bus extension apparatus of claim 11, wherein the transfer logic means includes register means for receiving, temporarily holding and transferring the information portions between the system bus means and the extended bus means.

14. The bus extension apparatus of claim 11, wherein the transfer logic means includes first register means for receiving and temporarily storing information portions from the system bus for transfer to the extended bus means, and second register means for receiving and temporarily storing information portions from the extended bus means for transfer to the system bus means.

* * * * *